Jan. 3, 1939.   A. F. HERB   2,142,974
BEARING FOR PRESS BEDS
Filed April 16, 1937
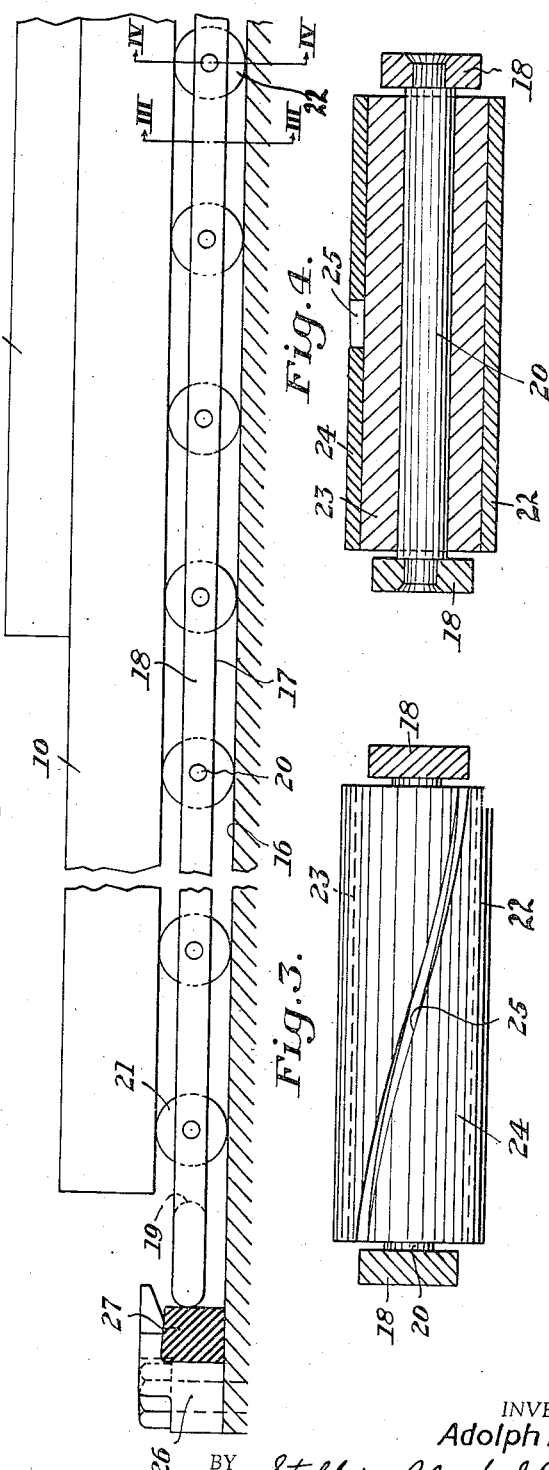
INVENTOR.
Adolph F. Herb
BY Stebbins Blenko & Parmelee
ATTORNEYS Patented Jan. 3, 1939

2,142,974

UNITED STATES PATENT OFFICE 2,142,974

BEARING FOR PRESS BEDS

Adolph F. Herb, Pittsburgh, Pa., assignor to Miller Printing Machinery Co., Pittsburgh, Pa., a corporation of Pennsylvania Application April 16, 1937, Serial No. 137,270

4 Claims. (Cl. 308—6)

This invention relates generally to printing presses and, in particular, to a roller bearing for supporting the bed of a press of the reciprocating flat bed type.

The reciprocating beds of flat bed presses have heretofore usually been supported on roller bearings traveling in tracks on the press frame. The bearings were composed simply of series of rollers linked together in any convenient manner and disposed loosely between the bed and the tracks. While this arrangement served satisfactorily for presses of moderate speed, severe bumping of the roller bearings against their end stops occurred when it was attempted to increase the press speed. In other words, the roller bearings apparently slipped between the bed and the tracks and struck the end stops with violent impact. This was highly objectionable, and considerable effort has been devoted to devising means for preventing such bumping. One expedient which has been tried is the provision of means for driving the bearing rollers positively, in synchronism with the reciprocation of the bed. Such means, however, add considerably to the cost of the press. I have invented a novel form of roller bearing for printing press beds which is quite inexpensive and yet provides a satisfactory solution to the problem pointed out above.

In accordance with my invention, I provide a roller bearing comprising a plurality of rollers journaled on shafts extending between side bars. The bearing is disposed between the bed and the track, in the customary manner. At least one of the rollers is so constructed as to be yieldable under pressure as, for example, by incorporating in it a split contractible sleeve, the normal diameter of which is slightly greater than the diameter of the other rollers. Preferably, two such rollers are provided at points intermediate the ends of the bearing. The effect of these rollers appears to be to provide sufficient friction between the bed and the tracks to prevent slippage of the bearing relative thereto. When the form on the bed is engaged by the impression cylinder, however, the split rollers are contracted under the pressure exerted thereby so that the load is distributed uniformly among several rollers of the bearing.

A complete understanding of the invention may be gained from a study of the following detailed description which is to be read in connection with the accompanying drawing illustrating a preferred embodiment. In the drawing, Fig. 1 is a diagrammatic side elevation showing the bed of a press supported on the tracks of the frame thereof by roller bearings in accordance with the invention;

Fig. 2 is a fragmentary view to enlarged scale showing a portion of the structure illustrated in Fig. 1;

Fig. 3 is a sectional view taken along the line III—III of Fig. 2 showing the split roller in one position; and Fig. 4 is a sectional view along the line IV—IV of Fig. 2 showing the split roller in a position 90° from that illustrated in Fig. 3.

Referring now in detail to the drawing, the bed of a printing press of the reciprocating flat bed type is indicated at 10. The bed is reciprocated beneath impression cylinders 11 and 12 by means which are already well known and require no detailed disclosure, whereby the forms 13 and 14 on the bed are successively engaged by sheets traveling through the machine around the impression cylinders 11 and 12 and a transfer cylinder 15. It will be recognized that the showing of Fig. 1 corresponds to what is known as a two-color press.

The bed 10 moves along tracks 16, of which there are usually four, formed in the frame of the press and is supported by a plurality of roller bearings, one of which is indicated generally at 17, cooperating with each of the tracks 16. Each of the roller bearings 17 comprises parallel side bars 18 connected adjacent their ends by cross bars 19. Shafts 20 extend between the side bars 18 at uniformly spaced intervals therealong. The majority of the shafts 20 have solid rollers 21 journaled thereon. Certain of the rollers, however, are of slightly different construction, specifically those indicated in Fig. 1 at 22, which construction is shown in detail in Figs. 3 and 4. Each of the rollers 22 is composed of an arbor 23 journaled on the shaft 20, and a sleeve 24 disposed over the arbor. The sleeve 24 is not continuous but has a helical slot 25 formed therein. The sleeve is preferably composed of suitable alloy steel, whereby it is adapted for contraction under pressure, and also is sufficiently hard to withstand wear satisfactorily. The normal external diameter of the sleeve 24 is slightly greater than the diameter of the solid rollers 21. The normal inside diameter of the sleeve, furthermore, is slightly greater than the outside diameter of the arbor 23, providing clearance therebetween (not shown). As a result, the weight of the bed 10 is carried principally by the rollers 22, except when the forms are engaged by the impression cylinders. At that time, the sleeves 24 of the rollers 22 are compressed and contracted so that the impression load is distributed among all the rollers underlying the forms during their engagement by the cylinders.

The difference between the sizes of the rollers 21 and the sleeve 24 may be indicated by a specific example in which the rollers 21 had a diameter of 1.125" while the normal outside diameter of the sleeves 24 was 1.132". Apparently, the invention disclosed prevents bumping of the roller bearings by providing sufficient friction at certain points between the bed and the tracks to prevent slippage of the bearings relative thereto. As shown in Fig. 1, the bed is out of engagement with the cylinders 11 and 12 as it approaches the limits of its movement. The rollers 22 are thus free to expand and therefore exert additional pressure on the tracks of the bed and press frame. The increased friction resulting therefrom tends to prevent the roller bearings from moving beyond the point to which they are actuated by movement of the bed. In any event, it is found that bumping of the bearings against their end stops (indicated at 26) is substantially eliminated. Any slight bumping that does occur may readily be absorbed by cushion blocks 27 of rubber or other suitable material.

The sleeves 24 are slightly contracted at all times inasmuch as their normal diameter exceeds that of the rollers 21 by .007", while the clearance between the tracks 16 and the gibs on the bed which guide movement of the latter along the tracks is usually only about .003". This clearance, of course, is reduced to the thickness of the oil films between the tracks and rollers and between the bed and the rollers when the forms on the beds are engaged by the impression cylinders.

It will be apparent from the foregoing that the invention provides a highly satisfactory solution to the problem of destructive bumping of the roller bearings. The special rollers 22 add very little to the cost of the complete bearings and serve effectively to prevent bumping at high speeds. This has been possible heretofore only by the costly expedient referred to at the beginning of this specification.

Although I have illustrated and described herein but one preferred embodiment of the invention, it will be apparent that changes in the construction disclosed may be made without departing from the spirit of the invention or the scope of the appended claims.

I claim:

1. In a press, the combination of a track, a bed reciprocating on the track, and a roller bearing between the track and the bed comprising a spacer frame and rollers held therein, the greater number of the rollers having a fixed diameter but at least one of the rollers having a diameter slightly greater than that of the majority of the rollers but being contractible under pressure to a diameter substantially the same as that of the majority of the rollers.

2. In a press, the combination of a track, a bed reciprocating on the track, and a roller bearing between the track and the bed comprising a spacer frame and rollers held therein, the greater number of the rollers having a fixed diameter, a few of the rollers having a diameter slightly greater than that of the other rollers but being contractible under pressure to a diameter substantially the same as that of the other rollers.

3. In a press, the combination of a track, a bed reciprocating on the track, and a roller bearing between the track and the bed comprising a spacer frame having side bars, shafts extending between the side bars, and rollers on the shafts, the greater number of the rollers being in the form of a stiff, continuous, metal annulus of a fixed diameter but at least one of the rollers including a contractible split outer ring having a normal diameter slightly greater than that of the majority of the rollers.

4. In a press, the combination of a track, a bed reciprocating on the track, and a roller bearing between the track and the bed comprising a spacer frame having side bars, shafts extending between the side bars, and rollers on the shafts, the greater number of the rollers being in the form of a stiff, continuous, metal annulus of a fixed diameter but at least one of the rollers including a rotatable arbor provided with a contractible, split, outer ring having a normal diameter slightly greater than that of the first-mentioned rollers, said ring being contractible under pressure to a diameter substantially equal to that of said first-mentioned rollers.

ADOLPH F. HERB.